March 2, 1971  W. TERZIAN  3,567,311
LENS SYSTEM HAVING SELECTIVELY CONTROLLABLE
SPHERICAL ABERRATION
Filed Nov. 20, 1969
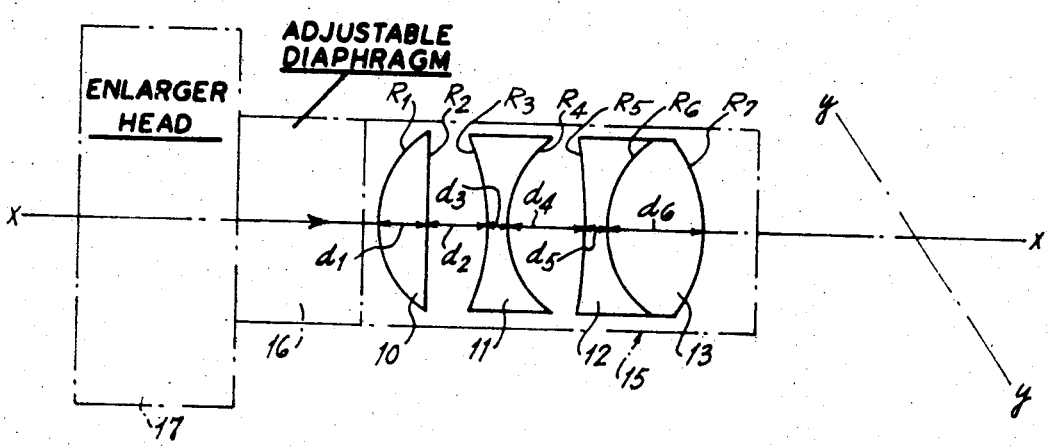
INVENTOR.
WILLIAM TERZIAN
BY
ATTORNEY

3,567,311
LENS SYSTEM HAVING SELECTIVELY CONTROLLABLE SPHERICAL ABERRATION
William Terzian, 25 Buckingham Place,
Manhasset, N.Y. 10030
Continuation-in-part of application Ser. No. 685,655,
Nov. 24, 1967. This application Nov. 20, 1969,
Ser. No. 878,419
Int. Cl. G02b 9/14, 13/20
U.S. Cl. 350—188　　　　　　　　　　　　　　2 Claims

ABSTRACT OF THE DISCLOSURE

A lens system for use in a photographic enlarger, in which spherical aberration can be introduced into an image format and in which said aberration can be selectively controlled. The paraxial region of the image format is in focus, and defocusing can be applied in a non-linear manner in an area surrounding the paraxial region. A plurality of lenses are employed having specific and relative focus-lengths, radii of curvature, axial thickness, and axial air space between the lenses, and also of particular refractive index and dispersive index.

---

This application is a continuation-in-part of my co-pending application Ser. No. 685,655, now abandoned, filed Nov. 24, 1967. This invention relates generally to a lens system for a photographic enlarger.

It is a known fact that the selective introduction of spherical aberration into photographic prints can produce very desirable and pleasing effects. Aberration has been produced in prior art devices by grinding diffusing grooves on a flat lens, that is, a lens having an infinite focal length such that the insertion of such a lens into a lens system does not affect the equivalent focal length of the system. It has also been suggested that the diffusing grooves be placed on other elements of the lens system which have a finite focal length. These systems did not work well because they could not produce a photographic image which has a portion in sharp focus and other portions that are slightly defocused. Another major disadvantage of the prior art lens systems is the expense involved in grinding grooves on the lenses. The depth and size of the grooves had to be very carefully controlled as well as the relative placement of the grooves on the lens system. Another major problem with such prior art devices is that the surface indentations, grooves or projections distort the image on the peripheral portions of its field. The grooves also produce annoying mirage effects whenever direct or even reflected light falls on them.

The desideratum in photographic lenses has generally been considered to be an exact point by point reproduction upon the plane of the photographic plate of all objects situated in a plane conjugate thereto in front of the lens over the widest practicable angle. To this end lens constructions have been modified to produce the flatest possible image surface free of aberrations over angles of 50 or 60 degrees or more, with the sharpest possible definition all over the field. Particularly the anastigmatic class of lenses has been widely used in which such corrections have been carried to extreme precision. Such lenses, while meeting extraordinarily well the requirement of the point to point representation of one plane upon another, cannot produce a diffusing affect so as to "soften" the photographic image.

Furthermore, in portrait photography it is essential that the eyes of the subject be clear and sharply in focus, while desirable results can be achieved by defocusing in the regions surrounding the eyes. Prior art lens systems do not have the capability of introducing selective and controlled spherical aberration into an image format which is printed from a negative to a positive or vice versa and therefore are not able to project image formats having the aforementioned desirable features.

Accordingly it is an object of this invention to provide a lens system whereby spherical aberration can be introduced into an image format.

It is a further object of this invention to provide a lens system for an enlarger whereby the spherical aberration introduced into an image format can be selectively controlled.

It is still a further object of this invention to provide a lens system whereby the paraxial region of the image format is in focus and defocusing can be applied in a non-linear manner in an area surrounding the paraxial region.

In accordance with an aspect of this invention, a lens system adapted for use with a photographic enlarger is provided with a lens barrel which has means thereon which permit the lens barrel to be fixed to the enlarger; a diaphragm adjustment means on the lens barrel adjustable about the optical axis of the lens barrel; and a series of lenses, which have spherical aberration associated therewith, and which are mounted within the lens barrel coaxially with the optical axis thereof and are spaced axially from the diaphragm adjustment means; the lenses projecting an image format capable of having spherical aberration introducible thereto; the format having a paraxial portion thereof which is in focus due to reduced aberration and a nonparaxial portion thereof which is defocused due to increased aberration; and the diaphragm adjustment means cooperating with the lenses to selectively control the amount of spherical aberration introducible into the image format.

The above, and other objects, features and advantages of this invention, will become apparent from the following detailed description of an illustrative embodiment which is to be read in conjunction with the accompanying drawing, in which:

The single figure is a diagrammatic side view showing the elements comprising a lens system in accordance with the present invention.

The figure shows a lens system mounted within a lens barrel 15 in cooperative relationship with a diaphragm adjustment means, such as a variable diaphragm 16 which may be built into the barrel mount. The diaphragm 16 may have the usual stops thereon and is adjustable so as to vary the size of the lens opening, and hence, the amount of light entering the lens barrel 15 from the enlarger head 17, the direction of entering light being indicated by the arrowhead on the optical axis $x$—$x$. The lens system, which has spherical aberration associated therewith, is mounted within lens barrel 15 coaxially with the optical axis $x$—$x$ of the barrel 15. The lens system, which is spaced axially from the diaphragm 16, projects an image format which is capable of having spherical aberration introducible thereto. This image format may have a paraxial portion which is in focus due to reduced aberration therein, and a nonparaxial portion which is defocused due to increased aberration therein. The variable diaphragm 16 cooperates with the lens system so as to selectively control the amount of spherical aberration introducible into the image format; the image format being substantially out of focus due to spherical aberration when the diaphragm 16 is in the full open position, corresponding to a small $f$ stop number, and the spherical aberration being reduced in said image format upon closing down the diaphragm opening to any one of its intermediate positions, or $f$ stops, such as $f8$ for women or $f11$ for men, until at a predetermined position, such as $f22$, the aberration is eliminated. Thus, by varying the $f$ stops on the lens system, the amount of introducible spherical aberration may be controlled.

In the illustrated embodiment, the lens system is shown to be a modification of a known Tessar objective that comprises a convex-plano lens 10, a double-concave lens 11, a double-concave lens 12 and a double-convex lens 13 arranged in succession in the direction of the entering light with air spaces between lens 11 and lenses 10 and 12 and with lenses 12 and 13 being cemented to constitute a doublet.

The Tessar objective modified according to the present invention may be dimensionally proportioned substantially as specified in the following table:

TABLE I

| Lens | Radii | Thickness and air spaces | $N_d$ | V |
| --- | --- | --- | --- | --- |
| 10 | $R_1=+.263F$ | $d_1=.037F$ | 1.6134 | 58.5 |
|    | $R_2=\infty$ | $d_2=.040F$ | Air | |
| 11 | $R_3=-.239F$ | $d_3=.017F$ | 1.5739 | 41.4 |
|    | $R_4=+.581F$ | $d_4=.053F$ | Air | |
| 12 | $R_5=-1.467F$ | $d_5=.017F$ | 1.53 | 51.1 |
|    | $R_6=+.223F$ | | | |
| 13 | $R_7=-.363F$ | $d_6=.046F$ | 1.6145 | 54.6 | in which F is the equivalent focal length of the lens system, the first column identifies the lenses, $R_1$–$R_7$ refer to the radii of curvature of the refractive surfaces numbered consecutively from the front to rear, that is, in the direction of the passage of light through the lens system, with the plus and minus values denoting surfaces that are respectively convex and concave to front, $d_1$, $d_3$, $d_5$ and $d_6$ refer to the axial thickness of the lenses 10, 11, 12 and 13, and $d_2$ and $d_4$ refer to the axial air spaces between lens 11 and lenses 10 and 12, respectively. $N_d$ denotes the refractive index for the D line of the solar spectrum, and V denotes the dispersive index.

A particular Tessar objective modified according to this invention and having an equivalent focal length F=100 mm. may be constructed substantially as specified in the following table:

TABLE II

| Lens | Radii, mm. | Thickness and air spaces, mm. | $N_d$ | V |
| --- | --- | --- | --- | --- |
| 10 | $R_1=+26.3$ | $d_1=3.7$ | 1.6134 | 58.5 |
|    | $R_2=\infty$ | $d_2=4.0$ | Air | |
| 11 | $R_3=-23.9$ | $d_3=1.7$ | 1.5739 | 41.4 |
|    | $R_4=+58.1$ | $d_4=5.3$ | Air | |
| 12 | $R_5=-146.7$ | $d_5=1.7$ | 1.53 | 51.1 |
|    | $R_6=+22.3$ | | | |
| 13 | $R_7=-36.3$ | $d_6=4.6$ | 1.6145 | 54.6 | in which, $R_1$–$R_7$, $d_1$–$d_6$, $N_d$ and V all have the meanings defined above in connection with Table I.

It will be seen that, in the modification of a Tessar objective described above, the lens 11 is arranged with its surface $R_3$ of relatively smaller radius of curvature facing toward the front, whereas the original Tessar objective, that is, prior to the modification, has its airspaced double-concave lens arranged with its surface of relatively larger radius of curvature facing toward the front. Thus, spherical aberration is introducible according to this invention merely by reversing the air-spaced double-concave lens of a conventional Tessar objective.

The operation of the lens system of the present invention in order to obtain an image format in which the spherical aberration present therein is not uniform across the image format will now be described. The operator of the enlarger 17 places a negative in the enlarger 17 and the diaphragm 16 is adjusted to its wide open position. The image is then focused on the enlarger platen. Initially at the wide open position of diaphragm 16, there is undesirable spherical aberration in the image format.

In the event a portrait is being enlarged, the eyes of the portrait are placed on a line y—y intersecting the axis x—x so that the eyes of the portrait will be at or near the paraxial region associated with the lens, and thus will be sharply in focus. Since the spherical aberration introducible into the image format increases outwardly from the paraxial region in a nonlinear manner, the areas of the projected image remote from the eyes of the portrait will be defocused. The diaphragm 16, then may be closed down thereby reducing aberration in a peripheral halo effect around the sharply in focus paraxial region of the image format, which enables control of the spherical aberration in an area circumscribing the face so as to soften the features present in the image format. The amount of defocusing which occurs varies with the degree of closure of the diaphragm 16, as previously described. The over-all effect produced is a portrait in which the portion of the image lying in axial alignment with the lens, that is, the paraxial portion of the image, is in focus and the area circumscribing this focused portion, that is, the nonparaxial portion of the image, is softened by being defocused. The area which is furthest from the focused portion has the greatest amount of spherical aberration.

Although an illustrative embodiment according to this invention has been described in detail herein with reference to the accompanying drawing, it is to be understood that the invention is not limited to this embodiment and that various changes and modifications may be made therein by one skilled in the art without departing from the scope or spirit of the invention.

What is claimed is:

1. A lens system for use with a photographic enlarger comprising a lens barrel having an optical axis and means on said barrel permitting the latter to be fixed to said enlarger; adjustable diaphragm means on said lens barrel; and lens means having spherical aberration associated therewith and being mounted in said lens barrel coaxially with the optical axis and spaced axially from said diaphragm means, said lens means projecting an image format capable of having spherical aberration introducible into said format, the format having a paraxial portion thereof which is in focus due to reduced aberration and a nonparaxial portion thereof which is defocused due to increased aberration, said adjustable diaphragm means co-operating with said lenses to selectively control the amount of spherical aberration introducible into the image format, and said lens means includes four lenses that are dimensionally proportioned and constructed substantially as follows:

| Lens | Radii, | Thickness and air spaces | $N_d$ | V |
|---|---|---|---|---|
| 10 | $R_1=+.263F$ | $d_1=.037F$ | 1.6134 | 58.5 |
|    | $R_2=\infty$ | $d_2=.040F$ | Air | |
| 11 | $R_3=-.239F$ | $d_3=.017F$ | 1.5739 | 41.4 |
|    | $R_4=+.581F$ | $d_4=.053F$ | Air | |
| 12 | $R_5=-1.467F$ | $d_5=.017F$ | 1.53 | 51.1 |
|    | $R_6=+.223F$ | $d_6=.046F$ | 1.6145 | 54.6 |
| 13 | $R_7=-.363F$ | | | | in which F is the equivalent focal length of said lens means, the first column identifies the lenses arranged in order from the front to rear, $R_1$, $R_2$, $R_3$, $R_4$, $R_5$, $R_6$, and $R_7$ refer to the radii of curvature of the refractive surfaces numbered consecutively from the front to rear with the plus and minus values denoting surfaces that are respectively convex and concave to the front, $d_1$, $d_3$, $d_5$, and $d_6$ refer to the axial thicknesses of the lenses 10, 11, 12, and 13 respectively, $d_2$ and $d_4$ refer to the axial air spaces between the lens 11 and the lenses 10 and 12, respectively, $N_d$ denotes the refractive index for the D line of the solar spectrum, and V denotes the dispersive index.

2. A lens system for use with a photographic enlarger comprising a lens barrel having an optical axis and means on said barrel permitting the latter to be fixed to said enlarger; adjustable diaphragm means on said lens barrel; and lens means having spherical aberration associated therewith and being mounted in said lens barrel coaxially with the optical axis and spaced axially from said diaphragm means, said lens means projecting an image format capable of having spherical aberration introducible into said format, the format having a paraxial portion thereof which is in focus due to reduced aberration and a nonparaxial portion thereof which is defocused due to increased aberration, said adjustable diaphragm means co-operating with said lenses to selectively control the amount of spherical aberration introducible into the image format, and said lens means includes four lenses that are constructed and arranged substantially in accordance with the following specifications:

| Lens | Radii, mm. | Thickness and air spaces, mm. | $N_d$ | V |
|---|---|---|---|---|
| 10 | $R_1=+26.3$ | $d_1=3.7$ | 1.6134 | 58.5 |
|    | $R_2=\infty$ | $d_2=4.0$ | Air | |
| 11 | $R_3=-23.9$ | $d_3=1.7$ | 1.5739 | 41.4 |
|    | $R_4=+58.1$ | $d_4=5.3$ | Air | |
| 12 | $R_5=-146.7$ | $d_5=1.7$ | 1.53 | 51.1 |
|    | $R_6=+22.3$ | $d_6=4.6$ | 1.6145 | 54.6 |
| 13 | $R_7=-36.3$ | | | | in which the first column identifies the lenses arranged in order from the front to rear, $R_1$, $R_2$, $R_3$, $R_4$, $R_5$, $R_6$, and $R_7$ refer to the radii of curvature of the refractive surfaces numbered consecutively from the front to rear with the plus and minus values denoting surfaces that are respectively convex and concave to the front, $d_1$, $d_3$, $d_5$, and $d_6$, refer to the axial thicknesses of the lenses 10, 11, 12 and 13 respectively, $d_2$ and $d_4$ refer to the axial air spaces between the lens 11 and the lenses 10 and 12, respectively, $N_d$ denotes the refractive index for the D line of the solar spectrum, and V denotes the dispersive index.

References Cited
UNITED STATES PATENTS

| | | | |
|---|---|---|---|
| 1,446,634 | 2/1923 | Bell et al. | 350—188 |
| 1,463,132 | 7/1923 | Graf | 350—188 |
| 1,482,503 | 2/1924 | Ames, Jr. | 350—188 |
| 1,924,527 | 8/1933 | Tronnier | 350—227 |
| 2,346,086 | 4/1944 | Schade et al. | 350—227 |
| 3,466,114 | 9/1969 | Ruben | 350—227X |

DAVID SCHONBERG, Primary Examiner

P. A. SACHER, Assistant Examiner

U.S. Cl. X.R.

350—227